(12) United States Patent
Avisar et al.

(10) Patent No.: US 12,541,927 B2
(45) Date of Patent: Feb. 3, 2026

(54) AUGMENTED REALITY SHARED ANCHORING SYSTEM AND METHOD

(71) Applicant: Surgical Theater, Inc., Los Angeles, CA (US)

(72) Inventors: Mordechai Avisar, Highland Heights, OH (US); Alon Yakob Geri, Orange Village, OH (US)

(73) Assignee: SURGICAL THEATER, INC., Los Angeles, CA (US)

( * ) Notice: Subject to any disclaimer, the term of this patent is extended or adjusted under 35 U.S.C. 154(b) by 396 days.

(21) Appl. No.: 18/013,819

(22) PCT Filed: Jun. 29, 2021

(86) PCT No.: PCT/US2021/039579
§ 371 (c)(1),
(2) Date: Dec. 29, 2022

(87) PCT Pub. No.: WO2022/006082
PCT Pub. Date: Jan. 6, 2022

(65) Prior Publication Data
US 2023/0298279 A1    Sep. 21, 2023

Related U.S. Application Data

(60) Provisional application No. 63/046,592, filed on Jun. 30, 2020.

(51) Int. Cl.
*G06T 19/00*  (2011.01)
*A61B 5/00*   (2006.01)
*G02B 27/01*  (2006.01)
*G06F 3/01*   (2006.01)
*G06F 3/0346* (2013.01)
*A61B 34/10*  (2016.01)
*A61B 90/00*  (2016.01)
*G09B 23/28*  (2006.01)

(52) U.S. Cl.
CPC .......... *G06T 19/006* (2013.01); *A61B 5/0033* (2013.01); *G02B 27/0172* (2013.01); *G06F 3/011* (2013.01); *G06F 3/0346* (2013.01); *A61B 2034/101* (2016.02); *A61B 2090/365* (2016.02); *G09B 23/28* (2013.01)

(58) Field of Classification Search
None
See application file for complete search history.

(56) References Cited

U.S. PATENT DOCUMENTS

| | | | |
|---|---|---|---|
| 8,373,391 B1* | 2/2013 | Allen | H02J 7/0044 |
| | | | 320/167 |
| 9,818,225 B2* | 11/2017 | Mao | A63F 13/825 |
| 2011/0216060 A1* | 9/2011 | Weising | A63F 13/00 |
| | | | 345/419 |
| 2014/0002496 A1* | 1/2014 | Lamb | G09G 5/00 |
| | | | 345/633 |
| 2018/0040167 A1* | 2/2018 | Weisman | A63F 13/30 |

(Continued)

*Primary Examiner* — Jwalant Amin

(57) ABSTRACT

A system and method for setting a shared anchor point for a plurality of AR headsets for displaying an augmented reality presentation that may include live and simulated images to all of the AR headsets based on the perspective of the shared anchor point. The system and method can be used to support a plurality of users for simulating or performing a medical procedure on a particular patient.

18 Claims, 7 Drawing Sheets

(56) References Cited

U.S. PATENT DOCUMENTS

| | | | |
|---|---|---|---|
| 2018/0285052 A1* | 10/2018 | Eade | G06F 3/1423 |
| 2018/0321894 A1* | 11/2018 | Paulovich | G06F 3/1454 |
| 2018/0341386 A1* | 11/2018 | Inomata | A63F 13/211 |
| 2020/0060767 A1* | 2/2020 | Lang | A61B 17/1778 |
| 2021/0346115 A1* | 11/2021 | Dulin | G06F 3/011 |
| 2022/0219076 A1* | 7/2022 | Chida | G02B 27/01 |

* cited by examiner

AUGMENTED REALITY SHARED ANCHORING SYSTEM AND METHOD

CROSS-REFERENCES TO RELATED APPLICATIONS

This application is the national stage of PCT application no. PCT/US2021/039579, filed on Jun. 29, 2021, which claims the benefit of U.S. Provisional Patent Application No. 63/046,592 filed on Jun. 30, 2020, both incorporated herein by reference.

BACKGROUND

Augmented reality ("AR") is an experience in which computer-generated content and information is seamlessly overlaid on top of a real-world environment in order to enhance the real world environment, thus augmenting a perception of the real world environment. AR is gaining in popularity and is becoming commonly used in a variety of applications ranging from gaming and entertainment to education and medical applications. For example, a medical professional may use AR technology during a patient consult to present patient specific information such as a view of a patient's anatomy on top of or within a real world view in order to educate the patient about a medical condition or procedure. Thus, when the patient puts on an AR headset, the patient is able to visualize an augmented view of a physical real world space such as an exam room, the space being augmented with the anatomical model and with additional overlaid information as directed by the medical professional. Such an augmented view may be advantageous over a virtual reality view, in which the patient is completely immersed in a computer-generated environment without a view of the real world, in that the patient is able to maintain visual contact with the medical professional and his other real world surroundings during the consult.

It may be further advantageous for the medical professional and the patient to share in the AR experience together so that the medical professional may better be able to educate the patient and provide for a better patient experience. For example, if both the medical professional and the patient could individually ware an AR headset and both see the same computer-generated content augmented in the same physical exam room from their own respective perspectives, the medical professional may more effectively communicate with the patient regarding the computer-generated content while still maintaining visual contact with the patient. However, in order to create such a shared experience of two or more AR headsets, all headsets must have a single reference or anchor point to place a virtual or computer-generated objects in the same physical location in space relative to the real world view.

Some solutions exist for creating such a shared AR experience for two or more headsets, but they have some shortcomings. For example, using Magic Leap's Spatial Alignment technology, a room is scanned, physical objects are identified, and information is uploaded to a cloud which facilitates a shared experience. However, Spatial Alignment requires internet connectivity in order to facilitate the shared AR experience. Moreover, the quality and success rate of the Spatial Alignment solution may be reduced without proper lighting. Thus, Spatial Alignment may not be an effective solution in situations where the lighting is poor or where internet connectivity is unavailable. Another option may be to use image tracking or QR tracking to determine a common anchor point. However, drifting often results in inaccuracies with such an approach.

SUMMARY

Provided are a plurality of example embodiments, including, but not limited to, a method for providing a shared augmented reality presentation, comprising the steps of:
positioning a first controller associated with a first AR headset at a first location in a physical space to set a first anchor point for the first AR headset;
positioning a second controller associated with a second AR headset near or at the first location to set a second anchor point for the second AR headset, said second anchor point substantially the same as said first anchor point;
calculating a shared anchor point based on the setting of the first anchor point and the second anchor point; and
displaying a shared augmented reality presentation to a user of the first AR headset and to the user of the second AR headset based on said shared anchor point.

Also provided is the above method, further comprising the steps of:
positioning the first controller at a second location in a physical space to set a third anchor point for the first AR headset;
calculating a first virtual anchor point using a mathematical formula on said first anchor point and said third anchor point.
positioning the second controller at or near the second location in a physical space to set a fourth anchor point for the second AR headset;
calculating a second virtual anchor point using a mathematical formula on said second anchor point and said fourth anchor point, wherein
said shared anchor point is calculated based on said first virtual anchor point and said second virtual anchor point.

Still further provided is system for providing a shared augmented reality presentation, comprising: a first AR headset; a first controller associated with the first AR headset, said first controller configured to detect its position in space; a second AR headset; a second controller associated with the second AR headset, said second controller configured to detect its position in space; a computer system executing software configured to perform the steps of:
receiving information about a first location in a physical space from the first controller to set a first anchor point for the first AR headset;
receiving information about a second location in the physical space from the second controller to set a first anchor point for the first AR headset, wherein said second location is detected to be at or near said first location;
calculating a shared anchor point based on the setting of the first anchor point and the second anchor point; and
displaying a shared augmented reality presentation to a user of the first AR headset and to the user of the second AR headset based on said shared anchor point.

Further provided is a method for providing a shared augmented reality presentation of a medical procedure, comprising the steps of:
configuring medical images of the tissues of a particular patient into patient models;
positioning a first controller associated with a first AR headset at a first location in a physical space to set a first anchor point for the first AR headset;

positioning a second controller associated with a second AR headset near or at the first location to set a second anchor point for the second AR headset, said second anchor point substantially the same as said first anchor point;

calculating a shared anchor point based on the setting of the first anchor point and the second anchor point; and displaying a shared augmented reality presentation of a medical procedure utilizing the patient models to a user of the first AR headset and to the user of the second AR headset based on said shared anchor point.

Also provided are additional example embodiments, some, but not all of which, are described hereinbelow in more detail.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1A:
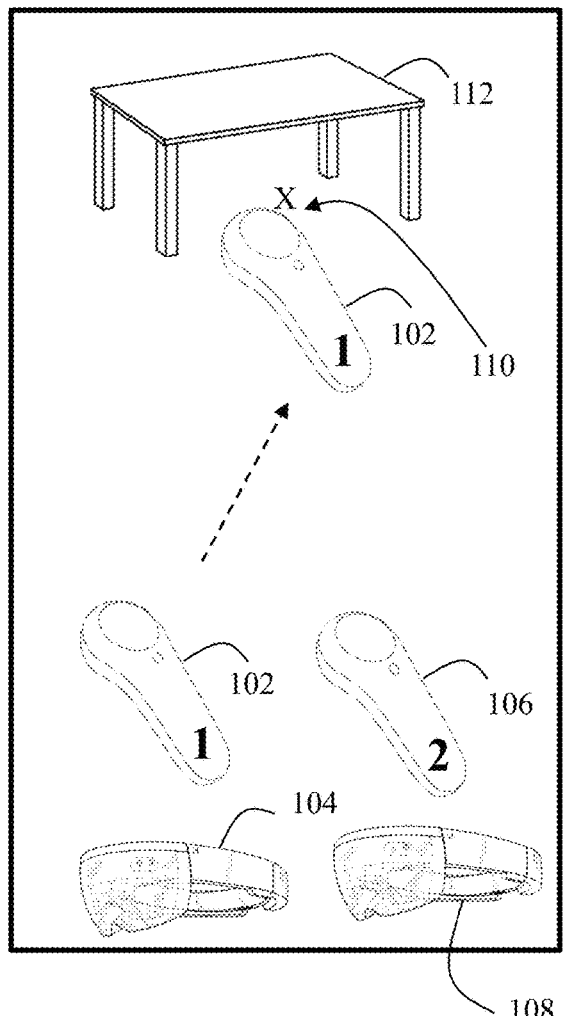
FIG. 1A illustrates an example augmented reality shared anchoring system.

This application provides improvements to the augmented reality simulation system described in the "Dual Mode Augmented Reality Surgical System And Method" in U.S. patent application Ser. No. 17/114,333 filed on Dec. 7, 2020, which provides further improvements to the "Hybrid Image/Scene Renderer With Hands Free Control" of U.S. patent application Ser. No. 14/402,746 filed on Nov. 21, 2014, both incorporated herein by reference.

The augmented reality shared anchoring system (hereinafter referred to as the "AR anchoring system") described herein enables user of two or more different AR headsets to share an experience by facilitating the creation of a single common anchor point among the two or more AR headsets using a mechanism which may be easier to implement, more efficient, and more stable as compared to existing known mechanisms. In particular, the AR anchoring system allows for an anchor point to be defined for a first AR headset based on one or more physical positions of the first AR headset or its associated controller, and then for a substantially identical anchor point to be defined for a second AR headset or its associated controller based on the one or more physical positions used for the anchor point defined for the first AR headset. Hence, the anchor point of the second AR headset is based on the anchor point of the second AR headset, defining a shared anchor point for both AR headsets. Anchor points may be defined by clicking a button on a controller associated with the AR headset or by performing a hand gesture or motion using the controller, or by some other method of activating the controller or headset to detect its location. Once each AR headset has established or defined the shared anchoring point, communication between all the headsets regarding any virtual objects in space will be performed by reference to the shared anchoring point, including a distance offset by x,y,z, and rotation offset by degrees. This allows all headsets using the shared anchoring point to see identical augmented reality presentations from the same perspective based on that shared anchoring point.

As used herein, the term "anchoring point" shall refer to a point in space that is defined as a reference for placing other virtual objects in space relative to that reference point. The reference is to the location (defined by a 3D Vector) and rotation. The term "world space" shall refer to a coordinate system that is mapped by an AR headset/system. The world space includes a 0,0 point or the anchor point that from which all objects' locations will be calculated. It should be appreciated that the mapping, and thus the 0,0 point, is different for every between AR headsets.

It should be appreciated that although specific references to healthcare applications may be made through out the examples described herein, the AR anchoring system may also be used for other applications. For example, the AR anchoring system may be used for entertainment purposes, for education purposes, and so on.

Figure 1B:
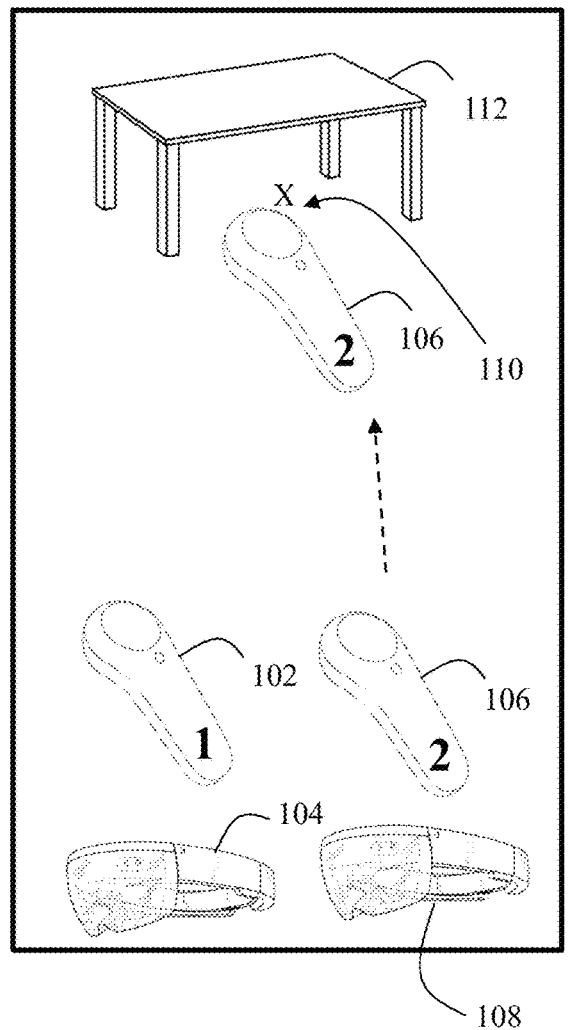
FIG. 1B illustrates an example augmented reality shared anchoring system.

FIGS. 1A and 1B illustrate an example single touch augmented reality shared anchoring system. As illustrated in FIG. 1A, a first controller 102 associated with a first AR headset 104 is moved to a location 110, as designated by an "X" for illustrative purposes, proximate to a table 112. It should be appreciated that the table 112 is used as an example for illustrative purposes. In practice, any suitable easily identifiable physical landmark or object may be used to help guide the positioning of the first controller 102. Once the first controller 102 is positioned at the location 110, an anchor point (not shown) is defined for the first controller 102 and associated first AR headset 104 based on the location 110 by recording the location and orientation of the controller 102. The anchor point may be defined by either performing a hand gesture using the controller 102 or by clicking a button on the controller 102. This anchor point can then become the shared anchor point for other AR headsets when set as provided herein.

As illustrated in FIG. 1B, once the anchor point is defined for the first controller 102 and associated first AR headset 104, the same anchor point may be defined for a second controller 106 associated with a second AR headset 108 by moving the second controller 106 to the same location 110 and similarly performing a hand gesture with the controller 106 or clicking a button on the controller 106 at the location 110. Once both the first controller 102 and the second controller 106 define an anchor point at the same physical location 110, a shared anchoring point is achieved between the first AR headset 104 and the second AR headset 108 such that both headsets may together experience a shared AR experience based on the perspective of the shared anchor point.

Figure 2A:
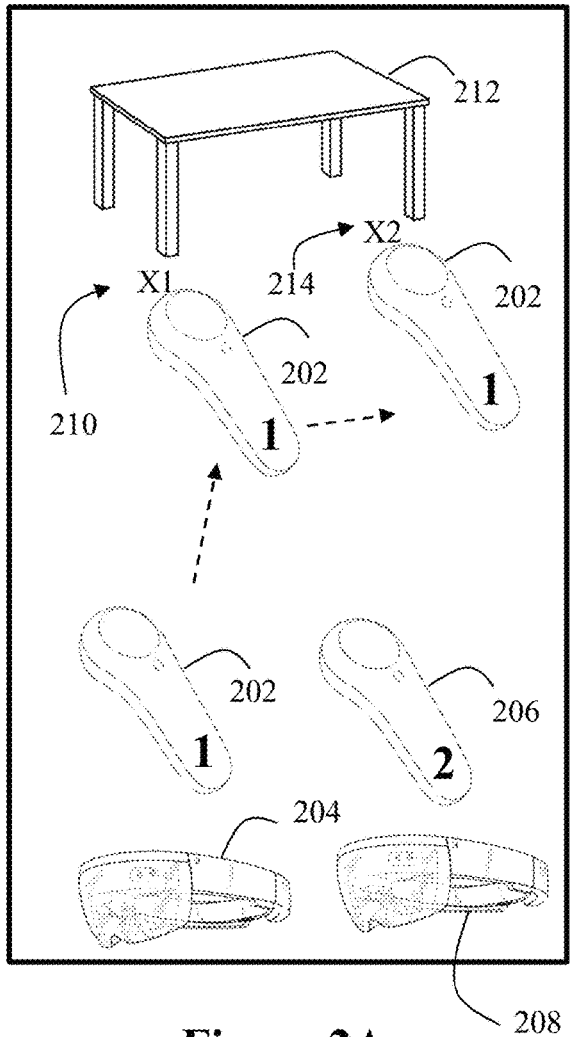
FIG. 2A illustrates an example augmented reality shared anchoring system.
Figure 2B:
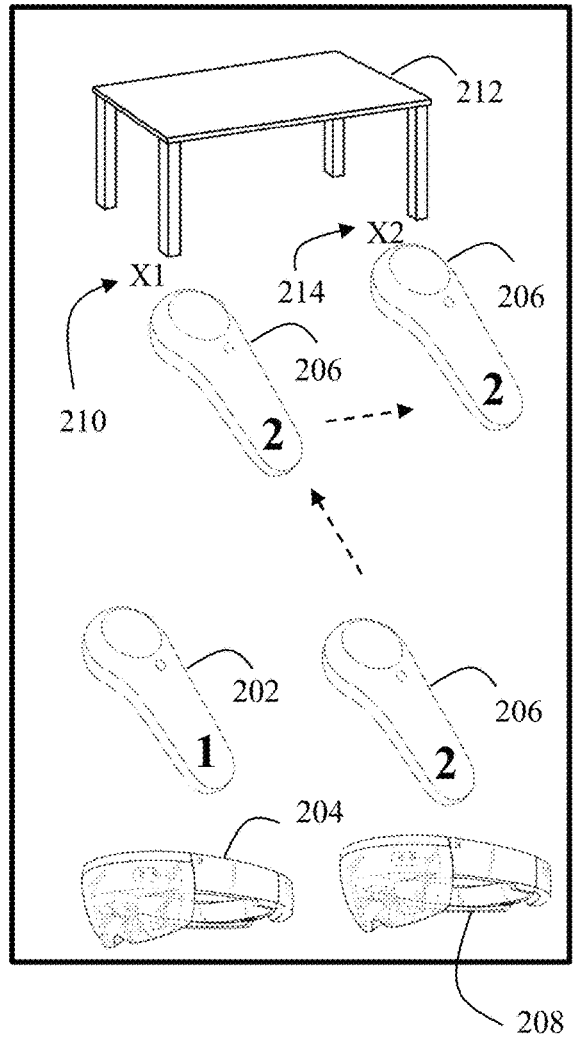
FIG. 2B illustrates an example augmented reality shared anchoring system.

In one example, in order to improve accuracy and eliminate the need for determining the rotation of a controller, a double touch system may be used. FIGS. 2A and 2B illustrate an example double touch augmented reality shared anchoring system. As illustrated in FIG. 2A, a first controller 202 associated with a first AR headset 204 is moved to a first location 210, as designated by an "X1" for illustrative purposes, proximate to a table 212. Once the first controller 202 is positioned at the first location 210, a first anchor point (not shown) is defined for the first controller 202 and associated first AR headset 204 based on the first location 210 by recording the location of the first controller 202. The first controller 202 associated with the first AR headset 204 is then moved to a second location 214, as designated by an "X2" for illustrative purposes, proximate to a table 212. Once the first controller 202 is positioned at the second location 214, a second anchor point (not shown) is defined for the first controller 202 and associated first AR headset 204 based on the second location 214 by recording the location of the first controller 202. In on example, the distance between the first location 210 and the second location 214 should be limited to 5 feet in order to improve accuracy.

Once the first and second anchor points are obtained for the first controller 202 and associated first AR headset 204, the AR headset 204 calculates a virtual anchoring point based on the first and second anchoring points. In particular, the AR headset 204 determines a location for the virtual anchoring point by calculating a mathematical average between the first anchoring point and the second anchoring point. Further, the AR headset 204 determines a rotation of the virtual anchoring point by performing a tangent function on the ration between the first anchoring point and the second anchoring point. Alternatively, the virtual anchor point can be defined by any mathematical formula desired based on the first and second anchoring points.

As illustrated in FIG. 2B, once the virtual anchoring point is defined for the first controller 202 and associated first AR headset 204, the same anchor point may similarly be defined for a second controller 206 associated with a second AR headset 208 as a shared anchoring point. In particular, the second controller 206 is moved to the first location 210. Once the second controller 206 is positioned at the first location 210, a first anchor point is defined for the second controller 206 and associated second AR headset 208 based on the first location 210 by recording the location of the second controller 206. The second controller 206 is then moved to the second location 214. Once the second controller 206 is positioned at the second location 214, a second anchor point is defined for the second controller 206 and associated second AR headset 208 based on the second location 214 by recording the location of the second controller 206. Once the first and second anchor points are obtained for the second controller 206 and associated second AR headset 208, the AR headset 208 calculates a shared anchoring point based on the first and second anchoring points, similar to the calculation method performed by the first AR headset 204, to define the shared anchor point. Once both the first AR headset 204 and the second AR headset 208 calculate the substantially identical shared anchoring point, both headsets may together experience a shared AR experience.

In one example, in order to improve accuracy, a mechanical guide may be used to direct the positioning of a controller for anchor setting.

Figure 3A:
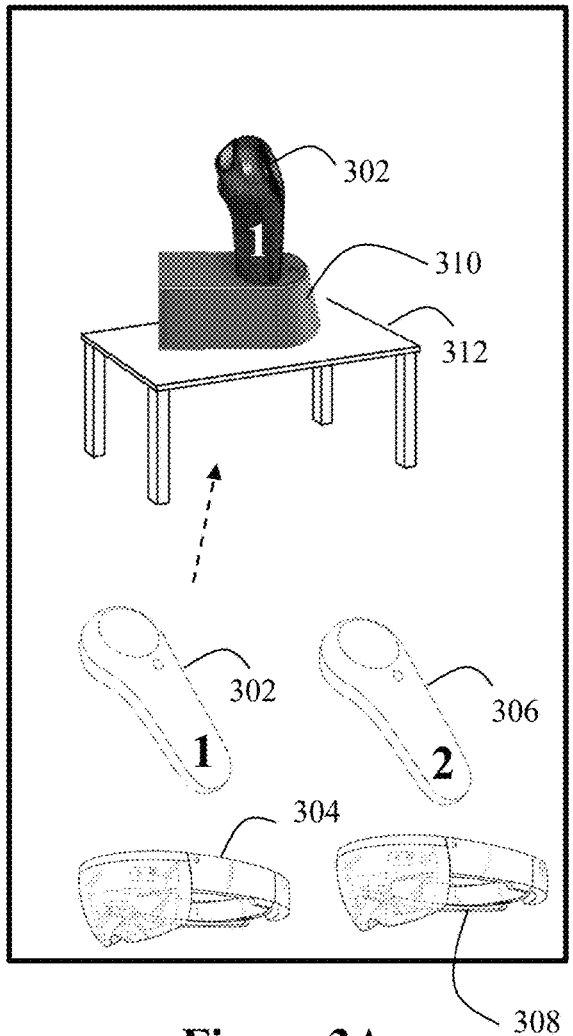
FIG. 3A illustrates an example augmented reality shared anchoring system.
Figure 3B:
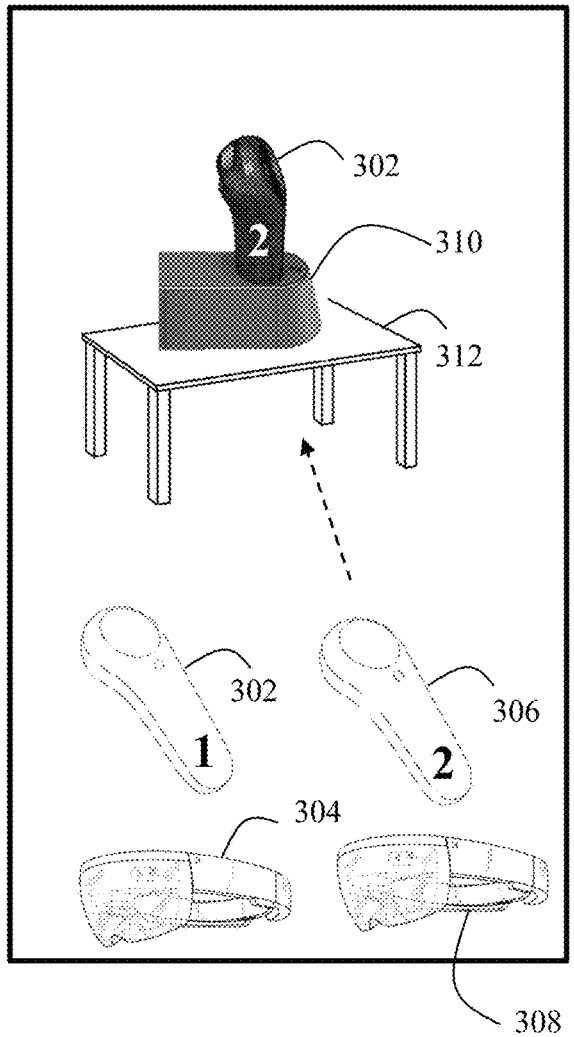
FIG. 3B illustrates an example augmented reality shared anchoring system.

FIGS. 3A and 3B illustrate an example single touch augmented reality shared anchoring system with mechanical guide. As illustrated in FIG. 3A, a first controller 302 associated with a first AR headset 304 is moved proximate to a mechanical guide 310, at or near a table 312. The mechanical guide 310 may include any suitable object for more accurately directing the placement of a controller. For example, the mechanical guide 310 may include a cradle configured to hold, grip, or otherwise temporarily secure the controller in a location. The cradle may be configured to be mechanically coupled to a surface such as the table 312 using an adhesive, a suction cup, a screw, and so on. The cradle may be part of a docking station designed to receive the controller. In another example, the mechanical device may be a marker indicating a location and rotation for placement of a controller without physically holding or securing the controller. Referring again to FIG. 3A, once the first controller 302 is positioned proximate to the mechanical guide 310, an anchor point is defined for the first controller 302 and associated first AR headset 304 by recording the location and orientation of the first controller 302.

As illustrated in FIG. 3B, once the anchor point is defined for the first controller 302 and associated first AR headset 304, the same anchor point may be defined for a second controller 306 associated with a second AR headset 308 by moving the second controller 306 to the same mechanical guide (docking station) 310 and similarly defining an anchor point for the second controller 304 and associated second AR headset 308 by recording the location and orientation of the second controller 306. Once both the first controller 302 and the second controller 306 define an anchor point at the same mechanical guide 310, a shared anchoring point is achieved between the first AR headset 304 and the second AR headset 308 such that both headsets may together experience a shared AR experience.

Figure 4:
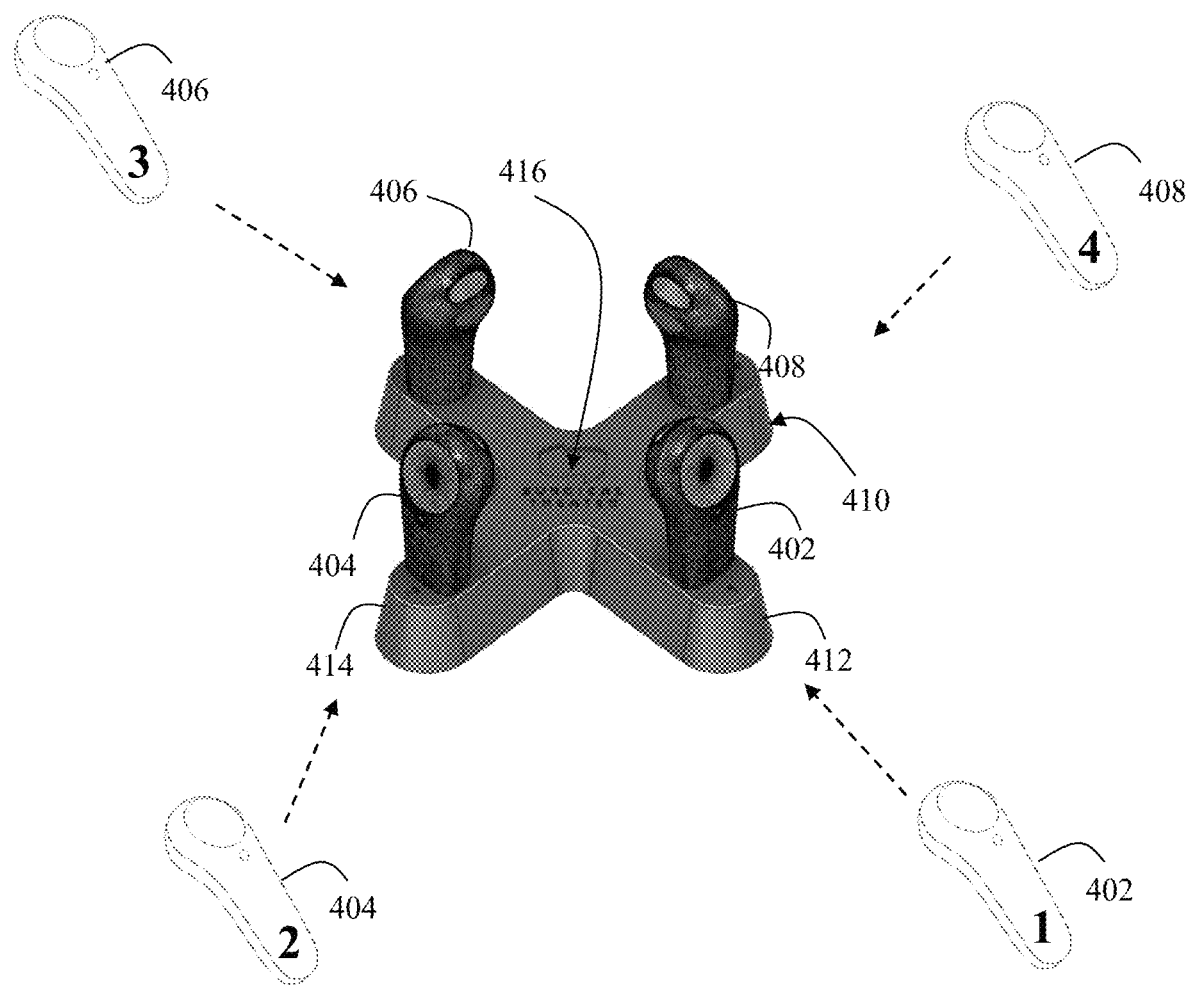
FIG. 4 illustrates an example augmented reality shared anchoring system.

In one example, a mechanical guide may be used to register 4 different devices with an identical or substantially identical shared anchoring point simultaneously. FIG. 4 illustrates an example single touch augmented reality shared anchoring system with a multi-device mechanical guide docking station 416 having a plurality of cradles, one for receiving a respective one of a plurality of controllers each associated with one of a plurality of AR headsets. The multi-device mechanical guide 416 is configured to direct the placement or positioning of multiple controllers simultaneously, such as in a docking station 416. For example, as illustrated, the multi-device docking station 416 may configured with multiple slots (cradles) 410, 412, 414 for receiving and securing multiple controllers. Although the example docking station 416 is illustrated to direct the placement of a first controller 402, a second controller 404, a third controller 406, and a fourth controller 408 in the respective cradles, the docking station 416 may be configured to simultaneously direct the placement of any suitable number of controllers, such as two, four, five, six, or more controllers by having associated cradles for each controller.

Once all of the controllers are positioned at the docking station 416, a determination may be made of a shared anchoring point based on the positions of respective controllers within or proximate to the docking station 416. The determination of the shared anchoring point is made by using a known or predetermined offset to calculate the shared anchoring point. In particular, each cradle/slot or predetermined position within the docking station 416 has associated with it a predetermined offset of coordinates with respect a master point which will serve as the shared anchor point. For example, a first cradle/slot 412 may be positioned at a certain offset with respect to a second cradle/slot 414. Further, both the first cradle/slot and the second cradle/slot 414 may be positioned with respective offsets with respect to a center point of the docking station 416, for example, or some other location as defined in advance or by mathematical formula.

It should be appreciated that an offset, as used herein, may refer to a combination of coordinates, including X, Y, and Z coordinates, as well as a rotational offset.

In one example, the master point can be defined as one of the cradles/slots or predetermined positions within the docking station 416, such as the first cradle/slot 412. In another example, the master point can be defined as any point such as the center point of the docking station 416. Thus, in order for a shared anchor point to be determined or calculated, the master point is adjusted using a respective offset assigned to a specific controller and associated AR headset or to a specific slot/position wherein the controller is positioned.

The shared anchoring point determinations/calculations can be accomplished in a number of ways. In one example, a peer-to-peer communication network between multiple AR headsets is used facilitate determining shared anchoring points for all AR headsets and associated controllers. In such an example, all controllers and associated AR headsets are assigned a unique identification number that matches a slot identification number on the docking station 416. Each slot number on the docking station 416 is in turn assigned a respective offset. A master or administrative AR headset is preprogrammed or otherwise given information about the identification number assigned to each AR headset as well as the offsets associated with each slot number on the docking station 416.

To begin the process of determining shared anchor points for each AR headset using a peer-to-peer communication network, respective controllers are each positioned at the docking station 416 such that the identification number assigned to the controller matches a number associated with a cradle/slot on the docking station 416. For example, the first controller 402 is positioned in the first cradle 412, and so on. The AR headset designated as the master, and thus the AR headset with knowledge of identification numbers associated with each of the remaining AR headset as well as with knowledge of the offsets associated with each the offsets associated with each slot number on the docking station 416, then stablishes wireless peer-to-peer communication with each of the remaining AR headsets. Once peer-to-peer communication is established, the master AR headset communicates to each of the other AR headset it's respective offset based on it's assigned identification number. The AR headsets the calculate their own respective shared anchor point based on the received offset and the current position of the associated controller at the multi-device mechanical guide 410.

In another example, in order to eliminate a need for a peer-to-peer network between the AR headsets, each individual AR headset may be pre-programmed or otherwise have knowledge of its own identification number as well as an associated offset. In such an example, an individual AR headset may calculate its shared anchoring point based on its own known offset and based on the current location of an associate controller without relying on a communication from a master AR headset. It should be appreciated that in such an example, in order for each individual AR headset to accurately calculate its offset, each associated controller must be placed in a corresponding location at the docking station 416 such that the identification number of the controller matches the number on the slot or location.

In yet another example, the docking station 416 is able to store electronic information with respect to each cradle or slot configured to receive and hold a controller. In particular, the docking station 416 includes computer memory for storing respective offsets associated with each slot. Further, the docking station 416 is configured to electrically couple to each controller received at a slot such that the docking station 416 is able to communicate information to the controllers. Thus, in such an example, the need for a peer-to-peer network is eliminated, as is the need to provide the controllers with identification numbers and to match the controllers with corresponding slots on the docking station 416. Rather, the controllers may be positioned in any slot and in any order and the docking station 416 is able to communicate to the each of the controllers a respective offset based on the slots the controllers are positioned in. Each of the AR headsets are then in turn able to calculate their own shared anchoring points based on the information received by their corresponding controllers from the docking station 416 and based on the current positions of respective controllers.

Figure 5:
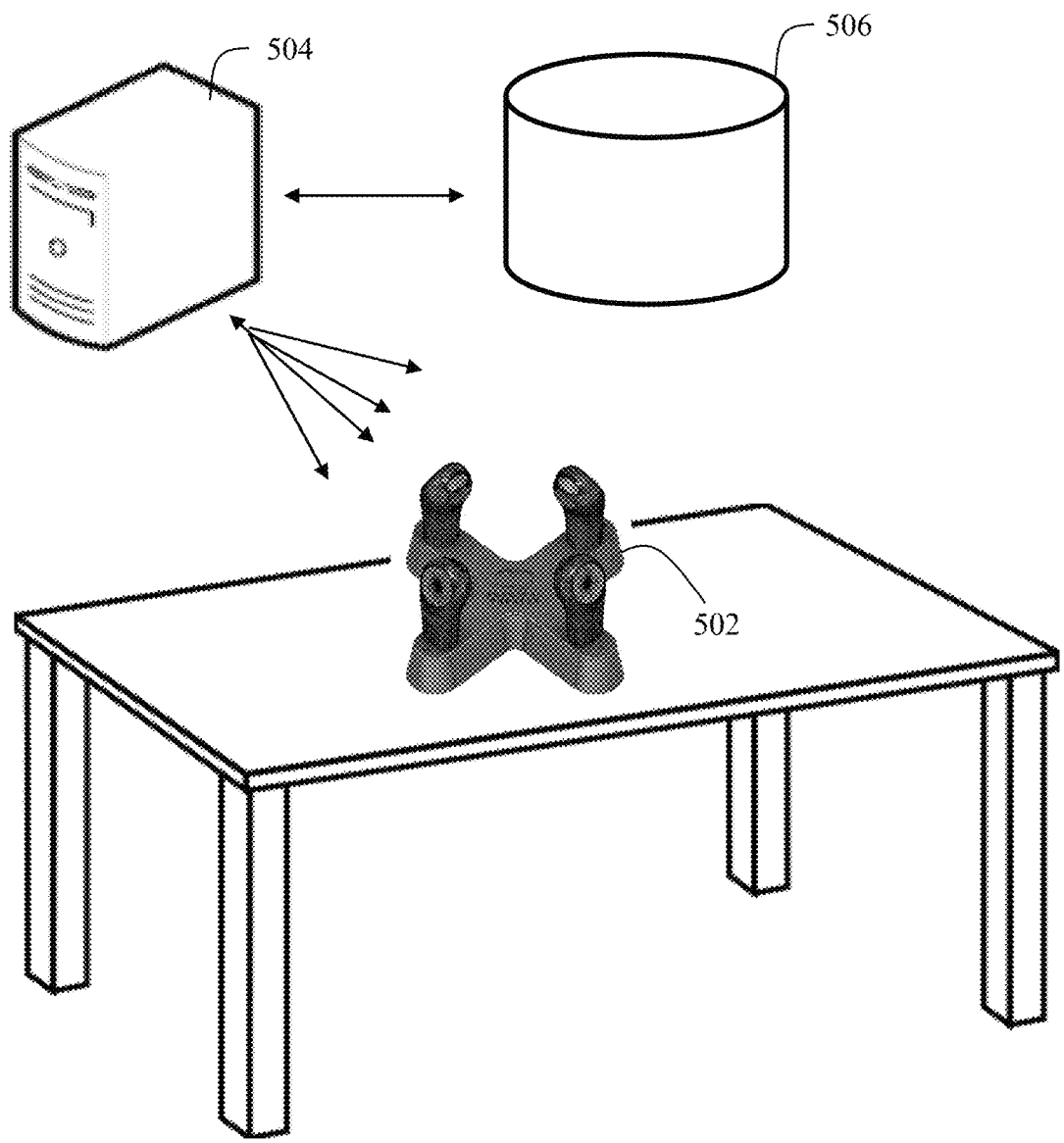
FIG. 5 illustrates an example augmented reality shared anchoring system.

In one example, as illustrated in FIG. 5, AR headsets and associated controllers are configured to be in wireless communication with a SNAP server 504 coupled to a database 506 while the controllers are positioned at a docking station 502. In such an example, the SNAP server may facilitate, from a centralized location, calculations of the shared anchor points as previously described in the different example of FIG. 4.

It should be appreciated that, although the examples described herein may make reference to the use of a shared anchoring point for a given point in time or for simultaneous use by multiple AR headsets simultaneously, the example shard anchoring systems and methods may also be used to share an anchoring point across different points in time. For example, provider of an AR experience, such as a museum or an entertainment venue, may wish to provide the identical AR experience with respect to a physical space for all users regardless of the time that the user visits the physical space and participates in the AR experience. Thus, the provider of the AR experience may desire for the user of an AR headset to set a specific anchor point in order to receive the AR experience as intended. Accordingly, the user may be directed to place a controller associated with an AR headset in a specific location in a physical room in order to establish a shared anchoring point as previously described.

Figure 6:
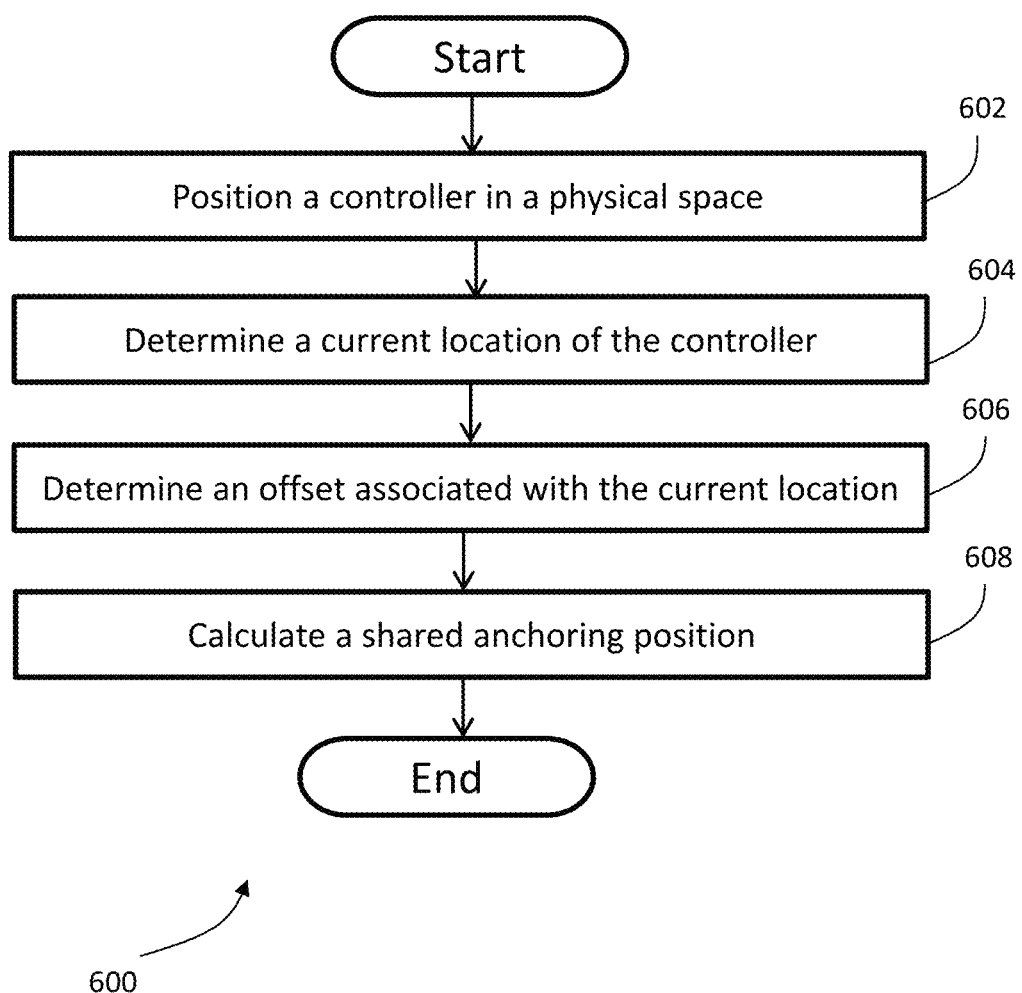
FIG. 6 illustrates an example method for augmented reality shared anchoring.

FIG. 6 illustrates an example augmented reality shared anchoring method 600. At 602, a controller associated with an AR headset is positioned in a physical space within which a shared AR experience is to be delivered to the AR headset. At 604, the coordinates of a current location of the controller is determined. At 606, an offset associated with the location of the controller is determined. At 608, a shared anchoring point is calculated based on the current location of the controller and the determined offset. Note that the controller, or alternatively a controller provided as part of the AR headset, can be configured with a GPS, compass, video, or other location detecting device or method to automatically detect its location to define the anchor points discussed above.

By setting a shared anchor point, it is possible to provide a shared AR experience to each user of an AR headset that is set to that shared anchor point. This allows providing an augmented reality presentation to the users that may combine live video and simulated images to be combined in a presentation that is displayed to the users via their AR headsets, all from the perspective of the shared anchor point. As the users move their heads and/or move around physically, they are each provided with images based on their movements from the perspective of the shared anchor point. Hence, all of the users are viewing the presentation from the same shared anchor point, with the ability of the individual users to change their perspective of that shared anchor point through head motions or by physically moving in space.

This shared experience can be used for medical purposes. For example, a shared anchor point might be chosen at the actual or virtual location of a particular patient that is being operated on (virtually, or in reality). The users can then view different parts of the patient by moving their heads, or they can walk "around" the patient by physically moving, always viewing the patient from the perspective of the shared anchor point, but adjusted by their direction of view and/or physical location. In this manner, focus for all users can be put on the location of a surgical procedure, for example, allowing the individual users to explore around the region and look at the patient from different perspectives. In this manner, multiple users can participate in the medical procedure as either observers or even as active participants supporting the medical procedure. When combined with the features of the '333 and the '746 applications, the users can participate in realistic simulations of medical procedures.

Figure 7:
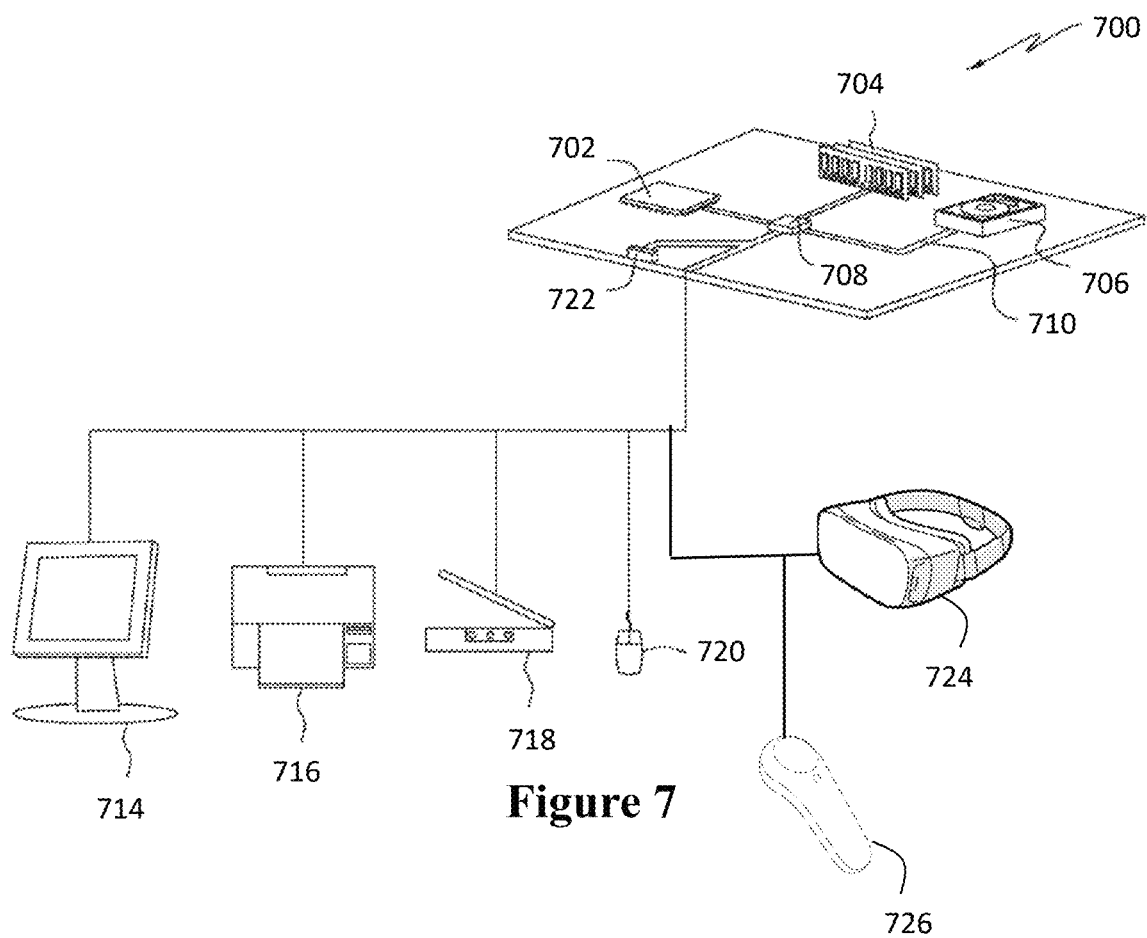
FIG. 7 illustrates an example computer implementing the example shared anchoring computer of FIG. 5.

FIG. 7 is a schematic diagram of an example computer for implementing the AR anchoring computer 502 of FIG. 5. The example computer 700 is intended to represent various forms of digital computers, including laptops, desktops, handheld computers, tablet computers, smartphones, servers, AR glasses, and other similar types of computing devices. Computer 700 includes a processor 702, memory 704, a storage device 706, and a communication port 708, operably connected by an interface 710 via a bus 712.

Processor 702 processes instructions, via memory 704, for execution within computer 800. In an example embodiment, multiple processors along with multiple memories may be used.

Memory 704 may be volatile memory or non-volatile memory. Memory 704 may be a computer-readable medium, such as a magnetic disk or optical disk. Storage device 706 may be a computer-readable medium, such as floppy disk devices, a hard disk device, optical disk device, a tape device, a flash memory, phase change memory, or other similar solid state memory device, or an array of devices, including devices in a storage area network of other configurations. A computer program product can be tangibly embodied in a computer readable medium such as memory 704 or storage device 706.

Computer 700 can be coupled to one or more input and output devices such as a display 714, a printer 716, a scanner 718, a mouse 720, a HMD 724, and a HMD controller 726.

As will be appreciated by one of skill in the art, the example embodiments may be actualized as, or may generally utilize, a method, system, computer program product, or a combination of the foregoing. Accordingly, any of the embodiments may take the form of specialized software comprising executable instructions stored in a storage device for execution on computer hardware, where the software can be stored on a computer-usable storage medium having computer-usable program code embodied in the medium.

Databases may be implemented using commercially available computer applications, such as open source solutions such as MySQL, or closed solutions like Microsoft SQL that may operate on the disclosed servers or on additional computer servers. Databases may utilize relational or object oriented paradigms for storing data, models, and model parameters that are used for the example embodiments disclosed above. Such databases may be customized using known database programming techniques for specialized applicability as disclosed herein.

Any suitable computer usable (computer readable) medium may be utilized for storing the software comprising the executable instructions. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CDROM), or other tangible optical or magnetic storage device; or transmission media such as those supporting the Internet or an intranet.

In the context of this document, a computer usable or computer readable medium may be any medium that can contain, store, communicate, propagate, or transport the program instructions for use by, or in connection with, the instruction execution system, platform, apparatus, or device, which can include any suitable computer (or computer system) including one or more programmable or dedicated processor/controller(s). The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, local communication busses, radio frequency (RF) or other means.

Computer program code having executable instructions for carrying out operations of the example embodiments may be written by conventional means using any computer language, including but not limited to, an interpreted or event driven language such as BASIC, Lisp, VBA, or VBScript, or a GUI embodiment such as visual basic, a compiled programming language such as FORTRAN, COBOL, or Pascal, an object oriented, scripted or unscripted programming language such as Java, JavaScript, Perl, Smalltalk, C++, C#, Object Pascal, or the like, artificial intelligence languages such as Prolog, a real-time embedded language such as Ada, or even more direct or simplified programming using ladder logic, an Assembler language, or directly programming using an appropriate machine language.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method for providing a shared augmented reality presentation, comprising the steps of:
    positioning a first controller associated with a first AR headset at a first location in a physical space to set a first anchor point for the first AR headset;
    positioning a second controller associated with a second AR headset near or at the first location to set a second anchor point for the second AR headset, said second anchor point substantially the same as said first anchor point;
    calculating a shared anchor point based on the setting of the first anchor point and the second anchor point; and
    displaying a shared augmented reality presentation to a user of the first AR headset and to the user of the second AR headset based on said shared anchor point;
    positioning the first controller at a second location in a physical space to set a third anchor point for the first AR headset;
    calculating a first virtual anchor point using a mathematical formula on said first anchor point and said third anchor point;
    positioning the second controller at or near the second location in a physical space to set a fourth anchor point for the second AR headset;
    calculating a second virtual anchor point using a mathematical formula on said second anchor point and said fourth anchor point, wherein
    said shared anchor point is calculated based on said first virtual anchor point and said second virtual anchor point.

2. The method of claim 1, wherein said first location is a docking station having at least one cradle configured to receive said first controller.

3. The method of claim 2, herein said cradle is configured to receive said second controller after said first controller is removed.

4. The method of claim 2, wherein said docking station has one or more additional cradles configured to receive one or more additional controllers, respectively.

5. The method of claim 4, herein said anchor point is defined also based on the location of all of the cradles with respect to each other.

6. The method of claim 2, wherein said anchor point is defined also based on the location of the first and second cradles with respect to each other.

7. The method of claim 1, wherein said shared augmented reality presentation is a presentation of a medical procedure provided for a particular patient utilizing realistic images of tissue of the particular patient generated by a computer system based on actual medical images taken of the patient.

8. A system for providing a shared augmented reality presentation, comprising:
    a first AR headset;
    a first controller associated with the first AR headset, said first controller configured to detect its position in space;
    a second AR headset;
    a second controller associated with the second AR headset, said second controller configured to detect its position in space;
    a computer system executing software configured to perform the steps of:
    receiving information about a first location in a physical space from the first controller to set a first anchor point for the first AR headset;
    receiving information about a second location in the physical space from the second controller to set a second anchor point for the second AR headset, wherein said second location is detected to be at or near said first location;
    calculating a shared anchor point based on the setting of the first anchor point and the second anchor point; and
    displaying a shared augmented reality presentation to a user of the first AR headset and to the user of the second AR headset based on said shared anchor point;
    wherein said shared anchor point is calculated based also on a third anchor point set for the first AR headset, and a fourth anchor point set for the second AR headset, said shared anchor point being calculated using a mathematical formula.

9. The system of claim 8 further comprising a docking station having at least one cradle configured to receive said first controller, wherein said first location is at the docking station.

10. The system of claim 9, wherein said cradle is configured to receive said second controller after said first controller is removed.

11. The system of claim 10, wherein said docking station has one or more additional cradles configured to receive one or more additional controllers, respectively.

12. The system of claim 11, wherein said anchor point is defined also based on the location of all of the cradles with respect to each other.

13. The system of claim 10, wherein said anchor point is defined also based on the location of the first and second cradles with respect to each other.

14. The system of claim 9, wherein said first controller is integrated with said first AR headset.

15. The system of claim 8, wherein said shared augmented reality presentation is a presentation of a medical procedure provided for a particular patient utilizing realistic images of tissue of the particular patient generated by a computer system based on actual medical images taken of the patient.

16. A method for providing a shared augmented reality presentation of a medical procedure, comprising the steps of:
    configuring medical images of the tissues of a particular patient into patient models;
    positioning a first controller associated with a first AR headset at a docking station having a plurality of cradles, said docking station in a physical space to set a first anchor point for the first AR headset;
    positioning a second controller associated with a second AR headset near or at the docking station to set a second anchor point for the second AR headset, said second anchor point substantially the same as said first anchor point;

calculating a shared anchor point based on the setting of the first anchor point and the second anchor point; and displaying a shared augmented reality presentation of a medical procedure utilizing the patient models to a user of the first AR headset and to the user of the second AR headset based on said shared anchor point;

positioning the first controller at a second docking station having at least one cradle, said second docking station in a physical space to set a third anchor point for the first AR headset;

calculating a first virtual anchor point using a mathematical formula on said first anchor point and said third anchor pint, positioning the second controller at or near the second docking station in a physical space to set a fourth anchor point for the second AR headset;

calculating a second virtual anchor point using a mathematical formula on said second anchor point and said fourth anchor point, wherein said shared anchor point is calculated based on said first virtual anchor point and said second virtual anchor point.

17. The method of claim 16, wherein said anchor point is defined also based on the location of all of the cradles with respect to each other.

18. The method of claim 16, wherein said shared augmented reality presentation is provided to support an actual medical procedure being performed on the particular patient using both live images of the patient and the patient models to generate realistic images of the tissue of the patient included in the presentation.

* * * * *